(12) United States Patent
Nobuta

(10) Patent No.: US 11,076,014 B2
(45) Date of Patent: Jul. 27, 2021

(54) COMPUTER-READABLE NON-TRANSITORY STORAGE MEDIUM, TERMINAL DEVICE, AND INFORMATION PROCESSING SYSTEM

(71) Applicant: Pokelabo, Inc., Tokyo (JP)

(72) Inventor: Iku Nobuta, Tokyo (JP)

(73) Assignee: POKELABO, INC., Tokyo (JP)

( * ) Notice: Subject to any disclaimer, the term of this patent is extended or adjusted under 35 U.S.C. 154(b) by 41 days.

(21) Appl. No.: 16/202,859

(22) Filed: Nov. 28, 2018

(65) Prior Publication Data
US 2019/0166219 A1 May 30, 2019

(30) Foreign Application Priority Data

Nov. 30, 2017 (JP) .............................. JP2017-230790

(51) Int. Cl.
*H04L 29/08* (2006.01)
*G06Q 30/02* (2012.01)
(Continued)

(52) U.S. Cl.
CPC ..... *H04L 67/2838* (2013.01); *G06Q 30/0209* (2013.01); *G06Q 30/0236* (2013.01);
(Continued)

(58) Field of Classification Search
None
See application file for complete search history.

(56) References Cited

U.S. PATENT DOCUMENTS 8,376,833 B1 * 2/2013 Gagner ............... G07F 17/3234
463/20
9,480,926 B2 * 11/2016 Mizuno ................... A63F 13/87
(Continued)

FOREIGN PATENT DOCUMENTS

JP  5841280 B1  11/2015

OTHER PUBLICATIONS

Extended European Search Report dated Apr. 1, 2019 issued in corresponding European Patent Application No. 18209253.6 (11 pgs.).
(Continued)

*Primary Examiner* — Dhairya A Patel
(74) *Attorney, Agent, or Firm* — Pillsbury Winthrop Shaw Pittman, LLP

(57) ABSTRACT

A computer-readable tangible non-transitory storage medium storing a program that causes a terminal device to perform: transmitting, to a first server device, a first instruction to store second identification information of a first user in association with first identification information of the first user; obtaining, from the first server device, a notification of completion of a process responding to the first instruction; displaying the completion of the process; transmitting, to the first server device, a second instruction to give the first user a bonus corresponding to a second user, when the second identification information of the second user is included in list information including the second identification information of other users associated with the first user in the second server device; obtaining a notification of completion of a process responding to the second instruction from the first server device; and displaying completion of the process.

17 Claims, 11 Drawing Sheets

(51) Int. Cl.
*H04L 29/06* (2006.01)
*H04W 12/06* (2021.01)
*H04W 88/02* (2009.01)

(52) U.S. Cl.
CPC ........ *H04L 63/083* (2013.01); *H04L 67/2833* (2013.01); *H04W 12/06* (2013.01); *H04W 88/02* (2013.01)

(56) References Cited

U.S. PATENT DOCUMENTS

| | | | | |
|---|---|---|---|---|
| 9,517,402 | B1* | 12/2016 | Vogel | H04L 63/1483 |
| 9,604,148 | B2* | 3/2017 | Uriu | A63F 13/48 |
| 9,694,287 | B2* | 7/2017 | Mizuno | A63F 13/35 |
| 10,183,222 | B2* | 1/2019 | Tsui | A63F 13/56 |
| 2010/0029379 | A1* | 2/2010 | Lo | A63F 13/335 |
| | | | | 463/29 |
| 2013/0103798 | A1* | 4/2013 | El Chami | H04L 65/4015 |
| | | | | 709/217 |
| 2014/0006505 | A1 | 1/2014 | Rama Rao et al. | |
| 2015/0220954 | A1* | 8/2015 | Jubb | G06Q 30/0211 |
| | | | | 705/14.13 |
| 2015/0328547 | A1 | 11/2015 | Uriu | |
| 2015/0375122 | A1* | 12/2015 | Stymne | A63F 13/48 |
| | | | | 463/29 |
| 2017/0014721 | A1* | 1/2017 | Mizuno | A63F 13/795 |
| 2017/0264681 | A1* | 9/2017 | Apte | H04L 67/12 |
| 2018/0293840 | A1* | 10/2018 | Chiang | G06F 16/435 |
| 2019/0037037 | A1* | 1/2019 | Umeya | G06F 21/121 |

OTHER PUBLICATIONS

Office Action dated Feb. 10, 2021 issued in corresponding European Patent Application No. 18209253.6 (11 pgs.).

* cited by examiner

| First Identification Information | User First Information | | | Second Identification Information | Second Follow List |
|---|---|---|---|---|---|
| | First Follow List | Status Flag | ... | | |
| U1-01 | *** | *** | ... | ... | ... |
| U1-02 | *** | *** | ... | ... | ... |
| ... | ... | ... | ... | ... | ... |

Fig. 2

| Second Identification Information | User Second Information | |
|---|---|---|
| | Second Follow List | ... |
| U2-01 | *** | ... |
| U2-02 | *** | ... |
| ⋮ | ⋮ | ⋮ |

Fig. 3

COMPUTER-READABLE NON-TRANSITORY STORAGE MEDIUM, TERMINAL DEVICE, AND INFORMATION PROCESSING SYSTEM

CROSS-REFERENCE TO RELATED APPLICATIONS

This application is based on and claims the benefit of priority from Japanese Patent Application Serial Nos. 2017-230790 (filed on Nov. 30, 2017), the contents of which are hereby incorporated by reference in their entirety.

TECHNICAL FIELD

The present disclosure relates to a computer-readable non-transitory storage medium storing a program, a terminal device, and an information processing system.

BACKGROUND

There has been known an information processing system that includes an information processing apparatus such as a server device and a terminal device, and provides a predetermined service to a user. For example, Japanese Patent No. 5841280 discloses a game system that includes a server device and a plurality of terminal devices, and provides a game in which users compete against each other.

Promotion of user's access to services provided through information processing apparatus has been desired. For example, use of a plurality of different services by users may be promoted through collaboration between the services.

SUMMARY

In view of the above, one object of the discloser is to provide a program, a terminal device, and an information processing system for encouraging users to use services provided through information processing apparatuses.

A program according to an embodiment of the disclosure, when executed, causes a terminal device communicable with a first server device that stores first identification information uniquely identifying a plurality of users and a second server device that stores second identification information uniquely identifying the plurality of users, to perform: a step of transmitting, to the first server device, a first instruction to store the second identification information of a first user among the plurality of users in association with the first identification information of the first user; a step of obtaining, from the first server device, a notification of completion of a process responding to the first instruction; a step of displaying the completion of the process responding to the first instruction; a step of transmitting, to the first server device, a second instruction to give the first user a bonus corresponding to a second user among the plurality of users, when the second identification information of the second user is included in list information including the second identification information of other users associated with the first user in the second server device; a step of obtaining, from the first server device, a notification of completion of a process responding to the second instruction; and a step of displaying completion of the process responding to the second instruction.

A terminal device according to an embodiment of the disclosure includes: a communication unit capable of communicating with a first server device that stores first identification information uniquely identifying a plurality of users and a second server device that stores second identification information uniquely identifying the plurality of users; a display unit; and a control unit. The control unit is configured to: transmit, to the first server device, a first instruction to store the second identification information of a first user among the plurality of users in association with the first identification information of the first user; obtain, from the first server device, a notification of completion of a process responding to the first instruction; display the completion of the process responding to the first instruction on the display unit; transmit, to the first server device, a second instruction to give the first user a bonus corresponding to a second user among the plurality of users, when the second identification information of the second user is included in list information including the second identification information of other users associated with the first user in the second server device; obtain, from the first server device, a notification of completion of a process responding to the second instruction; and display the completion of the process responding to the second instruction on the display unit.

An information processing system according to an embodiment of the disclosure includes: a first server device that stores first identification information uniquely identifying a plurality of users; and a terminal device capable of communicating with the first server device and a second server device that stores second identification information uniquely identifying the plurality of users. The terminal device transmits a first instruction to the first server device, in response to the first instruction from the terminal device, the first server device stores the second identification information of a first user among the plurality of users in association with the first identification information of the first user, the terminal device transmits a second instruction to the first server device, and in response to the second instruction from the terminal device, the first server device gives the first user a bonus corresponding to a second user among the plurality of users, when the second identification information of the second user is included in list information including the second identification information of other users associated with the first user in the second server device.

With the program, terminal device, and information processing apparatus according to one embodiment, it is possible to encourage users to use services provided by using information processing apparatuses.

BRIEF DESCRIPTION OF THE DRAWINGS

FIG. 2 illustrates information stored in a first server device.

FIG. 3 illustrates information stored in a second server device.

DESCRIPTION OF THE EMBODIMENTS

Embodiments of the invention will be hereinafter described.

Configuration of Information Processing System

Figure 1:
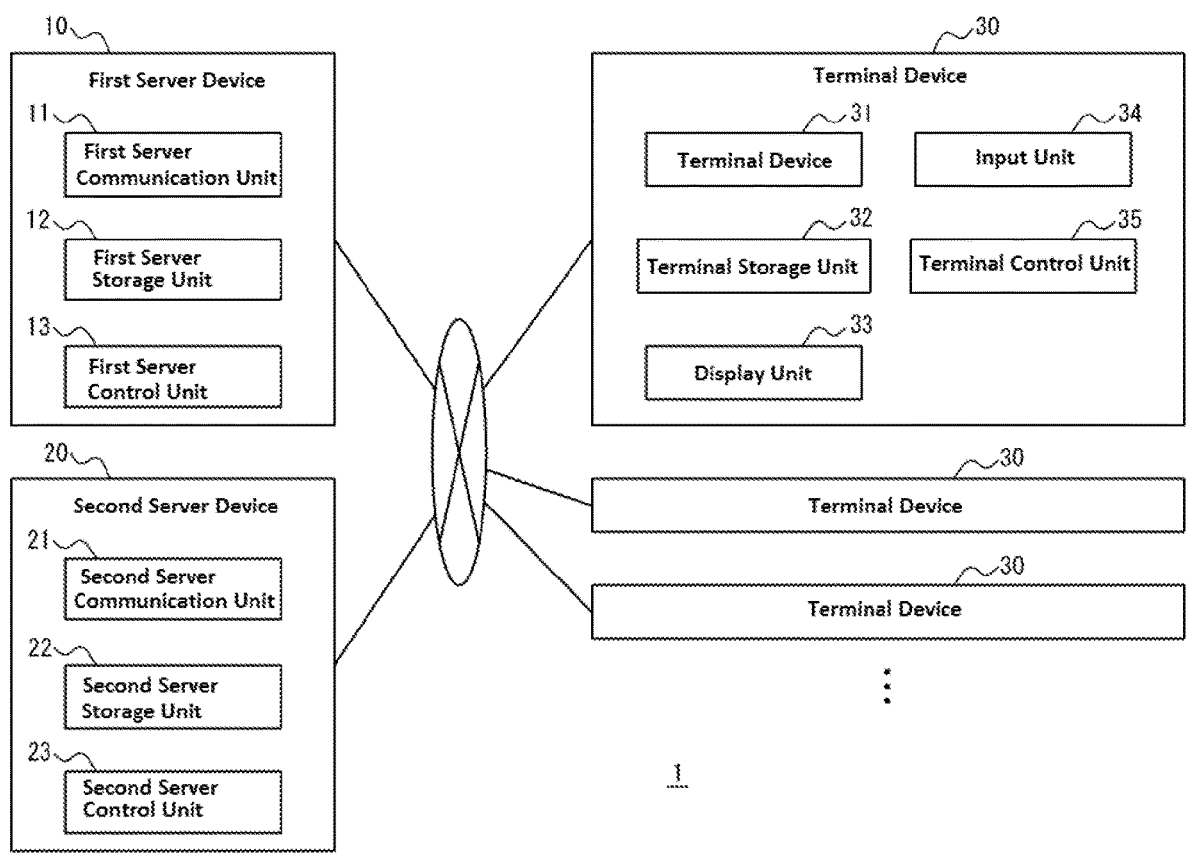
FIG. 1 is a block diagram illustrating an information processing system according to an embodiment of the disclosure.

With reference to FIG. 1, an overview of an information processing system 1 according to an embodiment of the invention will be described. The information processing system 1 includes a first server device 10, a second server device 20, and one or more terminal devices 30. Although FIG. 1 shows the three terminal devices 30 for the sake of convenience, any number of terminal devices 30 may be provided.

The first server device 10 is an information processing apparatus such as a server used for providing a service. In this embodiment, a service provided by using the first server device 10 is described as a game service that provides a game to users, however it is not limited to this. For example, an information distribution service, a social networking service, a cloud storage service, a net shopping service, or the like may be provided. Hereinafter, a service provided through the first server device 10 may also be referred to as a first service. For example, the first server device 10 may be managed by a provider of the first service.

The game in the embodiment includes one or more game parts. At least one of the one or more game parts may be executed using a game content described later. During execution of a game part, a game content may be operated, for example, by a user or AI (Artificial Intelligence). The AI may be realized by a processor provided in the first server device 10 or the terminal device 30, for example.

The game content is electronic data used in a game and may be any medium such as a card, an item, a virtual currency, a ticket, a character, an avatar, level information, status information, parameter information (health, attack, and the like), and statics information (skills, abilities, magic, jobs and the like). The game content may be obtained, possessed, used, managed, exchanged, integrated, reinforced, sold, discarded, or donated by a user in a game. However, how game contents are used in a game may not be limited to those described in this specification.

In the following description, unless explicitly stated otherwise, a "game content possessed by a user" refers to a game content associated with a user ID with which the user can be identified uniquely. "Imparting a game content to a user" refers to associating the game content with the user ID. "Discarding a game content that a user possesses" refers to dissolving the association between the user ID and the game content. "Consuming a game content that a user possesses" means that some effect or influence may be exerted in the game in accordance with the dissolution of the association between the user ID and the game content. "Selling a game content that a user possesses" refers to dissolving the association between the user ID and the game content and reassociating the user ID with another game content (such as virtual currency or an item). "Transferring a game content possessed by user A to user B" refers to dissolving the association between the user ID of the user A and the game content and reassociating the user ID of the user B with the game content. "Creating a game content" refers to defining or determining at least a part of information about the game content.

A game part may include any content that a user is able to play in the game. For example, a game part may include contents such as a quest, a mission, a mini game, acquisition, training, reinforcement and integration of a game content, exploring in a virtual space, and a battle with an opponent (e.g., other user, enemy character, enemy building and the like). For each game part, one or more predetermined game tasks may be set. For example, when it is determined that one or more predetermined game tasks set for each game part played by a user are successfully satisfied, a game content or the like may be given to the user as a reward. An example of the game task include, for example, winning a battle against an enemy character, reaching a goal point in a virtual space, maintaining a user's character so as not to fall in a predetermined state (for example, a state where the character's health is zero, which will be described later), or any tasks according to the contents of the game part can be adopted. Completion of a specific task (a task to be completed) among one or more game tasks set in a game part may also be referred to as clearing of the game part. When a user who plays a game part succeeds in completing the task to be completed, it may be determined that the user cleared the game part and the game part may be ended.

One or more game parts may include a single-player game part and a multi-player game part. The single-player game part may include, for example, a game part executed on the basis of a single user operation on one terminal device 30 used by the user (for example, a game part that is to be played by only one player). For example, the terminal device 30 alone executes the single-player game part or in conjunction with the first server device 10. On the other hand, multi-player game parts may include a game part that is common to two or more users and executed on the basis of users' operations on two or more terminal devices 30 used by the two or more users (for example, a game part that it to be played by more than one player). The game part common to two or more users may include, for example, a game part in which at least a part of advancement processing and processing results of the game part may be commonly applied to the two or more users. For example, the two or more terminal devices 30 execute a multi-player game part in cooperation, or the two or more terminal devices 30 and the first server device 10 execute the multi-player game content in cooperation. The multi-player game part may include a game part in which a plurality of users battle or cooperate in the game. One game part may compatible with both the single-play and the multiplay.

The second server device 20 is an information processing apparatus such as a server used for providing a service. In this embodiment, the service provided by using the second server device 20 is described as an information distribution service that allows specific or any users to access to messages, pictures and the like posted by a user. However it is not limited to this. For example, a game service, a social networking service, a cloud storage service, a net shopping service, or the like may be provided through the second server device 20. Specifically, the information distribution service may include existing services such as Twitter (registered trademark), Instagram (registered trademark), and Facebook (registered trademark). Hereinafter, a service provided through the second server device 20 may also be referred to as a second service. As will be described later, the second server device 20 may function as an authorization server and a resource server in authentication processing concerning linking between the first service and the second service. The second server device 20 may be managed by, for example, a provider of the second service. In the embodiment, it is assumed that the provider of the second service is different from the provider of the above-described first service.

The terminal device 30 may be an information processing apparatus used by a user, such as a mobile phone, a smart phone, a tablet device, a personal computer (PC) and a game machine. The terminal device 30 is capable of executing any application such as an application for receiving the first service, an application for receiving the second service, and a browser application for reproducing information resources on a network. In this embodiment, the network may include, for example, the Internet. The application may be obtained from a predetermined application distribution server over a network by the terminal device 30 or may be stored in advance in a storage device provided in the terminal device 30 or in a storage medium such as a memory card or the like readable by the terminal device 30. The terminal device 30 is communicably connected to the first server device 10 and the second server device 20 over a network.

The first server device 10 and the terminal device 30 perform various processes concerning a game in conjunction with each other. For example, the first server device 10 and the terminal device 30 may share execution of a series of processes. Further, for example, the first server device 10 and the terminal device 30 may execute the identical process. With respect to the identical process, when the processing results match between the first server device 10 and the terminal device 30, the first server device 10 and the terminal device 30 may finish the process. Whereas when the processing results do not match between the first server device 10 and the terminal device 30, the first server device 10 and the terminal device 30 may determine that the processing result of the first server device 10 is the correct result and finish the process, or the process may go back to the state before the execution of the identical process. In such a configuration, for example, even when a communication quality between the first server device 10 and the terminal device 30 is temporarily deteriorated, a likelihood of immediate interruption of processing is low. Further, in the terminal device 30, even if an illegal process such as rewriting of a game parameter is performed, it is possible to increase a likelihood that the illegal process can be eliminated. The second server device 20 and the terminal device 30 also perform various processes concerning information distribution in conjunction with each other. For example, the second server device 20 and the terminal device 30 may share execution of a series of processes.

A user using the first service can follow other users who use the first service in the first service. In the embodiment, "a user follows another user in the service" encompasses associating the user with another user within the service. For example, one user associated with another user may be able to view information such as a message transmitted by the associated other user in the service, or browsing the information transmitted by the associated other user in the service may be facilitated (for example, by a simpler operation than usual) for the user. In the same manner, a user using the second service can follow other users who use the second service. In the embodiment, identification information for uniquely identifying a user and list information (hereinafter also referred to as a follow list) listing other users that the user has followed are created and stored independently for each service. For example, the identification information (first identification information) and the follow list (a first follow list) of a user in the first service are different from the identification information (second identification information) and the follow list (a second follow list) of the user in the second service.

In the embodiment, collaboration with the second service is performed in the game related to the first service. More specifically, for users who use both the first service and the second service, association between the first identification information, and the second identification information and the second follow list is performed. Further, in the embodiment, the state of a user in the first service may change from a normal state to a specific state, which will be described later. A bonus that can be used in the first service is given to a user who is following a prescribed other user in the second service. According to this, a user is able to receive the bonus that can be used in the first service by following the prescribed other user in the second service. In this way, it is possible to give users motivation to use both the first service and the second service. Therefore, use of both the first service and the second service by users is promoted. The details of the embodiment will be now described below.

Configuration of First Server Device

The configuration of the first server device 10 will be specifically described. The first server device 10 includes a first server communication unit 11, a first server storage unit 12, and a first server control unit 13.

The first server communication unit 11 includes one or more interfaces that communicate with external devices in a wired or wireless manner and transmit and receive information thereto/therefrom. The first server communication unit 11 may include, for example, a wireless local area network (LAN) communication module or a wired LAN communication module. The first server communication unit 11 is able to transmit and receive information to and from the second server device 20 and the terminal devices 30 respectively over the network.

The first server storage unit 12 includes one or more memory units. For example, the memory unit may include a semiconductor memory, a magnetic memory, an optical memory, or the like. The first server storage unit 12 may serves as, for example, a primary storage or a secondary storage. The first server storage unit 12 may be built in the first server device 10 or may be connected to the first server device 10 via an interface. The first server storage unit 12 stores information and programs used for processing of a game. At least a part of the information and programs stored in the first server storage unit 12 may be shared and synchronized with the terminal devices 30.

For example, the first server storage unit 12 stores information concerning a plurality of users using the first service. FIG. 2 illustrates information concerning two users among the plurality of users. The information concerning users may include any information unique to the users. For example, the information concerning users includes the first identification information and user first information. When the above-mentioned second identification information and the second follow list are obtained by the first server device 10, the second identification information and the second follow list may be added to the information concerning users. In the information concerning users, the user first information, the second identification information, and the second follow list are each associated with the first identification information.

The first identification information is information that can uniquely identify users in the first service. The first identification information may be, for example, a user name or a user ID used in the first service. The first identification information may be determined automatically, for example, when a user starts using the first service, or based on an user input. Hereinafter, the first identification information of a user may also be simply referred to as a "user".

The user first information includes, for example, the first follow list and a status flag. The first follow list includes first identification information of other users associated with a user represented by the first identification information in the first service. The status flag indicates the state of the user represented by the first identification information in the first service. In this embodiment, the state that a user can take in the first service include the normal state and the specific state. The states of a user will be described in detail later. Details of the second identification information and the second follow list will be also described later.

The user first information may further include any information other than the first follow list and the status flag. For example, the user first information may further include account information for the user to use the first service, an image or an avatar of the user used in the first service, and a game content possessed by the user in a game related to the first service.

The information stored in the first server storage unit 12 is not limited to the above examples. The first server storage unit 12 may further store any information used for operations of the first server device 10.

The first server control unit 13 shown in FIG. 1 includes one or more processors. The processor may include a general purpose processor and a dedicated processor dedicated to a specific processing. The first server control unit 13 controls operations of the first server device 10 as a whole.

For example, the first server control unit 13 stores, in the first server storage unit 12, various types of information and programs used for processing a game. The information used for the processing of a game may include the above-mentioned information concerning a user who uses the first service.

For example, the first server control unit 13 performs transmission and reception of information via the first server communication unit 11. The first server control unit 13 may transmit at least a part of information stored in the first server storage unit 12 to the terminal device(s) 30. In this way, the information stored in the first server storage unit 12 and the information stored in the terminal device(s) 30 may be shared and synchronized with each other. A timing at which sharing and synchronization of the information is performed may include, for example, when new information is stored in the first server storage unit 12, when information stored in the first server storage unit 12 is updated, but may be any predetermined timing. Further, for example, the first server control unit 13 may retrieve any information input, determined, or generated in the terminal device(s) 30 via the first server communication unit 11.

For example, the first server control unit 13 performs processing of a game in cooperation with the terminal device(s) 30. More specifically, the first server control unit 13 cooperates with the terminal device 30 to control the state of a user who uses the terminal device 30 in the first service. The state of a user in the first service may include the state of the user in a game related to the first service. In this embodiment, the state of a user in the first service is either the normal state or the specific state. For example, the first server control unit 13 and the terminal device 30 may change the state of a user from the normal state to the specific state in response to occurrence of a first event related to the user. The first event may include an event occurring in the game played by the user. For example, the first event may include an event in which the user uses a game content such as a predetermined item in the game. The first server control unit 13 and the terminal device 30 may dissolve the specific state of the user after the elapse of a certain period of time. For example, when a predetermined time has elapsed since the user entered the specific state, the state of the user is switched to the normal state. Alternatively, the first server control unit 13 and the terminal device 30 may end the specific state of the user according to the number of times the user has caused a game effect which will be described later. For example, when the game effect is generated three times for the user who is in the specific state, the state of the user is switched to the normal state.

While the user using the terminal device 30 is in the specific state, the first server control unit 13 cooperates with the terminal device 30 to cause a game effect in which the user can more advantageously play the game in the game. The game effect may include, for example, an effect in which the number of game contents and points that the user can acquire by game play or a parameter associated with a game content is increased than in the normal case, but the invention is not limited thereto. The game effect generated for the user may be enhanced when the number of other users who have, in their second follow list, the second identification information of the user in the specific state is increased. Alternatively, each time the second identification information of the user in the specific state is added to the second follow list(s) of other user(s), the game effect generated for the user may be enhanced.

More specifically, in response to a first instruction from the terminal device 30, the first server control unit 13 acquires the second identification information of the user who uses the terminal device 30 and stores the second identification information in association with the first identification information of the user. For example, the second identification information may be acquired from the terminal device 30 or may be acquired from the second server device 20. Upon completion of a series of processes in response to the first instruction, the first server control unit 13 transmits a notification of the completion of the series of processes to the terminal device 30.

More specifically, in response to a second instruction from the terminal device 30, the first server control unit 13 acquires the latest second follow list of the user who uses the terminal device 30 and stores it in association with the first identification information of the user. The second follow list may be acquired from the second server device 20 using, for example, an API (Application Programming Interface) distributed by a provider of the second service. When the second identification information of another predetermined user (a second user) is included in the obtained second follow list, the first server control unit 13 imparts, to the user, a bonus associated with the second user. For example, the second user includes a user who is in the specific state in the first service as described above, but it is not limited thereto. For example, in another embodiment in which the state of the user switches between the normal state and the specific state in the second service, the second user may include the user who is in the specific state in the second service.

In this embodiment in which the first service is a game service, the bonus may be, for example, allowing activation of a game function in the game. The game function may include, for example, a function that enables the user to play the game more advantageously, but it is not limited thereto. The function that enables the user to play the game more advantageously may include, for example, a function in which the number of game contents and points that the user can obtain by game play or a parameter associated with a game content is increased than in the normal case, but the invention is not limited thereto. The first server control unit 13 cooperates with the terminal device 30 to enable the game function corresponding to the bonus. In cooperation with the terminal device 30, the first server control unit 13 may disable an enabled game function, for example after the elapse of a certain period of time. For example, when the specific state of another user corresponding to the bonus is dissolved after the elapse of a certain period of time, the game function corresponding to the bonus may be disabled. Further, for example, when an effective period is set for the bonus itself, the game function corresponding to the bonus may be disabled when the effective period expires.

The condition for disabling the enabled game function is not limited to the passage of time. For example, the number of times in which the game functions is allowed to be enabled may be set in the bonus itself. In such a case, the first server control unit 13 may disable the game function when the number of times of execution of the game process corresponding to the enabled game function (for example, the process of increasing the points obtained by the user compared to the normal time) reaches the set number. In this case, the bonus of the predetermined number of times may be similarly associated with other user(s) who follows the user that is associated with the bonus of the predetermined number of times of enabling the game function. Alternatively the game function corresponding to the bonus may be disabled under any conditions other than the effective period and the number of times of enabling, or a combination of two or more such conditions.

Here, the content of the bonus associated with the second user (that is, the content of the game effect to be generated for the second user) and the content of the bonus associated with the first user following the second user (that is, the content of the game function corresponding to the bonus given to the first user) may be the same or different. Also, the degree of the bonus given to the second user may be different from the degree of the bonus given to the first user. For example, in a case where the second user purchases a paid item and obtains a bonus in the first service (for example, a game effect in which points to be obtained is increased by 100 points), an effect of a bonus given to the first user who follows the second user may be, for example, 10% of the bonus associated with the second user (for example, a game function in which points to be obtained increase by 10 points). In this way, it is possible to make an opportunity to encourage the first user to purchase a paid item. Although the example in which the degree of the bonus effect is expressed as a percentage has been described above, it should be noted that the effective period of a game item and the like, the number of times a predetermined effect can be obtained, or the number of game contents, and the like may be different between the second user and the first user.

Here, a plurality of enabled game functions may exist simultaneously. In this way, the first user is motivated to follow a plurality of users in the second service. Furthermore, the number of the enabled game functions that can exist simultaneously may be limited. For example, it is assumed that a bonus associated with the second user is 100% and the first user who follows the second user is given the effect of 10% of the bonus. Under such circumstances, assuming that the first user is following 20 second users associated with the bonus, 200% of the effect of the bonus is associated with the first user. Here, by setting an upper limit for the number of the game functions to, for example, "5", it is possible to limit the effect up to 50%. According to such a configuration, even when the number of other users in a specific state included in the acquired second follow list as described above is relatively large, the number of game functions actually effective is restricted so that the game balance can be appropriately adjusted.

The content of the bonus is not limited to the above examples. The feature in which a bonus is given to users may also be adopted in other embodiments where the first service is a service other than the game service. For example, in another embodiment where the first service is an online shopping service, a bonus may be a benefit of enabling, for example, any function related to net shopping. The function may include, for example, a function that allows a user to purchase an item at a lower price, a function that allows the user to purchase a specific item preferentially over other users, etc. However, the function is not limited to these. The bonus may be determined according to the content of the first service.

Upon completion of the series of processes in response to the second instruction, the first server control unit 13 transmits a notification of the completion of the series of processes to the terminal device 30.

More specifically, in response to a third instruction from the terminal device 30, the first server control unit 13 transmits, to the second server device 20, a disclosure request for information indicating that the user using the terminal device 30 is in the above-described specific state. In response to the disclosure request, the information is disclosed in the second service. Consequently, a user using the second service is able to know other users who are in the specific state based on the information posted in the second service. Upon completion of the series of processes in response to the third instruction, the first server control unit 13 transmits a notification of the completion of the series of processes to the terminal device 30.

More specifically, in response to a fourth instruction from the terminal device 30, the first server control unit 13 associates the user using the terminal device 30 with other user specified in the fourth instruction. More specifically, the first server control unit 13 adds, to the first follow list of the user, the first identification information of the other user specified in the fourth instruction. Upon completion of a series of processes in response to the fourth instruction, the first server control unit 13 transmits a notification of the completion of the series of processes to the terminal device 30.

The operation of the first server device 10 controlled by the first server control unit 13 is not limited to the above example. For example, the first server control unit 13 may further execute any process other than the above-described process in conjunction with the second server device 20 or the terminal device 30 or by the first server device 10 alone.

Configuration of Second Server Device

The configuration of the second server device 20 will be specifically described. The second server device 20 includes a second server communication unit 21, a second server storage unit 22, and a second server control unit 23.

The second server communication unit 21 includes one or more interfaces that communicate with external devices in a wired or wireless manner and transmit and receive information thereto/therefrom. The second server communication unit 21 may include, for example, a wireless LAN communication module or a wired LAN communication module. The second server communication unit 21 is able to transmit and receive information to and from the second server device 10 and the terminal devices 30 respectively over the network.

The second server storage unit 22 includes one or more memory units. The second server storage unit 22 may serves as, for example, a primary storage or a secondary storage. The second server storage unit 22 may be built in the second server device 20 or may be connected to the second server device 20 via an interface. The second server storage unit 22 stores information and programs used for processing of information distribution. At least a part of the information and programs stored in the second server storage unit 22 may be shared and synchronized with the terminal devices 30.

For example, the second server storage unit 22 stores information concerning a plurality of users using the second service. FIG. 3 illustrates information concerning two users among the plurality of users. The information concerning users may include any information unique to the users. For example, the information concerning users includes the second identification information and user second information. In the information concerning users, the user second information is associated with the first identification information.

The second identification information is information that can uniquely identify users in the second service. The second identification information may be, for example, a user name or a user ID used in the first service. The second identification information may be determined automatically, for example, when a user starts using the second service, or based on user input. Hereinafter, the second identification information of a user may also be simply referred to as a "user".

The user second information includes, for example, the second follow list. The second follow list includes second identification information of other users associated with a user represented by the second identification information in the second service. The user second information may further include any information other than the second follow list. For example, the user second information may further include account information for the user to use the second service, an image or an avatar of the user used in the second service, and information such as messages posted by the user in the second service.

The information stored in the second server storage unit 22 is not limited to the above examples. The second server storage unit 22 may further store any information used for operations of the second server device 20.

The second server control unit 23 shown in FIG. 1 includes one or more processors. The second server control unit 23 controls operations of the second server device 20 as a whole.

For example, the second server control unit 23 stores, in the second server storage unit 22, various types of information and programs used for processing of information distribution. The information used for the processing of information distribution may include the above-mentioned information concerning users using the second service.

For example, the second server control unit 23 performs transmission and reception of information via the second server communication unit 21. The second server control unit 23 may transmit at least a part of information stored in the second server storage unit 22 to the terminal device(s) 30. In this way, the information stored in the second server storage unit 22 and the information stored in the terminal device(s) 30 may be shared and synchronized with each other. A timing at which sharing and synchronization of the information is performed may be, for example, when new information is stored in the second server storage unit 22, when information stored in the second server storage unit 22 is updated, but may be any predetermined timing. Further, for example, the second server control unit 23 may obtain any information input, determined, or generated in the terminal device(s) 30 via the second server communication unit 21.

For example, the second server control unit 23 performs processing of information distribution in conjunction with the terminal device(s) 30. For example, in response to a disclosure request for information such as a message, the second server control unit 23 discloses the information. The disclosure request may be obtained from the terminal device 30 or may be obtained from the first server device 10. Disclosure of information may be executed in such a manner that only users of the second service can view it, or it may be executed in such a manner that it can be viewed by all users accessible to the network.

Further, the second server control unit 23 cooperates with the terminal device 30 to execute, for example, an authentication process concerning linking of the first service with the second service. The authentication process may be executed using any authentication protocol such as the OAuth protocol. By the authentication process, the first service is permitted to be linked with the second service. In this specification, the "permitted" state includes a state in which a predetermined process is actually executed when execution of the predetermined process is attempted. Whereas a "not permitted" state includes a state in which the predetermined process is not executed even when execution of the predetermined process is attempted. More specifically, through the authentication process, a predetermined access right to a resource related to the second service is given to a first application related to the first service.

The operation of the second server device 20 controlled by the second server control unit 23 is not limited to the above example. For example, the second server control unit 23 may further execute any process other than the above-described process in conjunction with the first server device 10 or the terminal device 30 or by the second server device 20 alone.

Configuration of Terminal Device

The configuration of the terminal device 30 will be specifically described. As shown in FIG. 1, the terminal device 30 includes a terminal communication unit 31, a terminal storage unit 32, a display unit 33, an input unit 34, and a terminal control unit 35.

The terminal communication unit 31 includes an interface that communicates with an external device in a wired or wireless manner and transmits and receives information. The terminal communication unit 31 may include a wireless communication module that conforms with a mobile communication standard such as Long Term Evolution (LTE) (registered trademark), a wireless LAN communication module, a wired LAN communication module, or the like. The terminal communication unit 31 can transmit and receive information to and from the first server device 10 over the network.

The terminal storage unit 32 includes one or more memory units. The terminal storage unit 32 may serves as, for example, a primary storage or a secondary storage. The terminal storage unit 32 may be built in the terminal device 30 or may be connected to the terminal device 30 via an interface.

The terminal storage unit 32 stores information and programs used for processing of a game related to the first service. For example, the terminal storage unit 32 may store an application program of a game obtained from a predetermined application distribution server. Hereinafter, an application program may also be simply referred to as an application. An application of a game related to the first service is also referred to as a first application. The terminal storage unit 32 may store a part or all of information concerning a user using the first service, which is obtained from the first server device 10.

The terminal storage unit 32 stores information and programs used for processing of information distribution related to the second service. For example, the terminal storage unit 32 may store an application of information distribution obtained from a predetermined application distribution server. An application of information distribution related to the second service is also referred to as a second application. The second application may be provided by a provider of the second service, for example, or may be provided by a third party other than the provider of the second service. The terminal storage unit 32 may store a part or all of information concerning a user using the second service, which is obtained from the second server device 20.

The information stored in the terminal storage unit 32 is not limited to the above examples. The terminal storage unit 32 may further store any information used for operations of the terminal device 30. For example, the terminal storage unit 32 may store a browser application for reproducing information resources on the network.

The display unit 33 may include a display device such as a liquid crystal display and an organic EL display. The display unit 33 is capable of displaying various screens.

The input unit 34 includes any input interface that receives a user operation. The input interface may include, for example, a pointing device such as a mouse, a physical key, a touch panel integrally provided with the display unit 33, and the like.

The terminal control unit 35 includes one or more processors. The terminal control unit 35 controls operations of the terminal device 30 as a whole.

For example, the terminal control unit 35 transmits and receives information via the terminal communication unit 31. Specifically, the terminal control unit 35 may obtain an application from a predetermined application distribution server. More specifically, the terminal control unit 35 may transmit and receive information to and from the first server device 10 and the second server device 20, respectively.

For example, the terminal control unit 35 activates the first application in response to an operation of a user. In a state where the first application is activated, the terminal control unit 35 cooperates with the first server device 10 to execute processing of the game.

Specifically, the terminal control unit 35 causes the display unit 33 to display a screen used for the game. On the screen, for example, a plurality of GUIs (Graphic User Interfaces) for detecting user operation may be displayed. The terminal control unit 35 is able to detect a user operation on the screen via the input unit 34.

More specifically, the terminal control unit 35 cooperates with the second server device 20 to execute, for example, an authentication process concerning linking of the first service with the second service. The authentication process may be executed via the first application, or the actual process may be executed on the server through the above-described browser application. Specific example of screens (a first screen and a second screen) displayed on the terminal device 30 at the time of executing the authentication process will be described later.

When linking between the first service and the second service is permitted by the authentication process, the terminal control unit 35 transmits a first instruction to the first server device 10. The first instruction is an instruction to cause the first server device 10 to execute linking between the first service and the second service. More specifically, the first instruction includes an instruction to cause the first server device 10 to store the second identification information of a user using the terminal device 30 in association with the first identification information of the user. The first instruction may include the second identification information of the user or may include an instruction to obtain the second identification information of the user from the second server device 20. When the terminal control unit 35 receives, from the first server device 10, a notification of completion of a series of processes responding to the first instruction, the terminal control unit 35 shows the completion of the series of processes on the display unit display unit. A specific example of a screen (a third screen) displayed on the terminal device 30 at the time of execution of linking between the first service and the second service will be described later.

More specifically, the terminal control unit 35 transmits the second instruction to the first server device 10. The second instruction includes an instruction to cause the first server device 10 to obtain the latest second follow list of the user (the first user) using the terminal device 30 from the second server device 20 and an instruction to give the first user a bonus associated with a predetermined other user (the second user) when the second identification information of the second user is included in the obtained second follow list. For example, the second user includes a user who is in the specific state in the first service as described above, but it is not limited thereto.

Transmission of the second instruction may be executed at any timing. For example, the terminal control unit 35 may execute the transmission in response to occurrence of a second event in the game. The second event may include, for example, an event in which the screen is redirected to a predetermined screen in the game. Here, the screen concerning the second event may be a screen having a probability of being repeatedly displayed according to play of the game by the user.

For example, the screen displayed in response to the occurrence of the second event may be a home screen of the game. The home screen is a screen for allowing a user to select one or more game parts included in the game, for example. When a game part is selected on the home screen, for example, a display on the display unit 33 transitions to a screen dedicated to the selected game part, and the game part is started. A specific example of the home screen (a fourth screen) displayed on the terminal device 30 in response to the occurrence of the second event will be described later.

Alternatively, the screen displayed in response to the occurrence of the second event may be a game title screen. The title screen is a screen displayed, for example, at the start of the game, at the time of resetting, at the time of updating the first application, and the like. For example, in response to user's operation on the title screen, the display of the display unit 33 transitions to a predetermined game screen.

The transmission of the second instruction may be performed when a predetermined time or more has elapsed after a previous transmission of the second instruction. In such a case, when the predetermined time has not elapsed after the previous transmission of the second instruction, next transmission of the second instruction will not be performed even if the second event occurs.

According to this configuration, it is possible to adjust transmission frequency of the second instruction appropriately. More specifically, for example, in the above-described API for acquiring the second follow list, when acquisition frequency of the second follow list is limited (for example, acquisition of the second follow list is performed up to 15 times per 15 minutes), if the transmission frequency of the second instruction is too high, it becomes impossible to obtain the second follow list temporarily due to the limitation, which results in inconvenience. On the other hand, since the second follow list may be updated at any time in the second service, if the frequency at which the second instruction is transmitted is too low, inconvenience such as use of an old second follow list may occur. Thus, by appropriately setting the second event as the trigger to transmit the second instruction, the transmission frequency of the second instruction can be adjusted, and in this way the probability of occurrence of the above-mentioned inconvenience is reduced. Further, since the next second instruction is allowed to be transmitted only when a predetermined time or more has elapsed since the previous transmission of the second instruction, it is possible to decrease the probability that the transmission frequency of the second instruction becomes higher than necessary. Consequently the probability of occurrence of the above inconvenience is further reduced.

When the terminal control unit 35 receives, from the first server device 10, a notification of completion of the series of processes responding to the second instruction, the terminal control unit 35 notifies the completion of the series of processes on the display unit 33. As described above, in cooperation with the first server device 10, the terminal control unit 35 enables and disables a game function according to a bonus given to a user. For example, the terminal control unit 35 and the first server device 10 may enable a game function corresponding to a bonus when the bonus is given to a user. The terminal control unit 35 and the first server device 10 may disable an enabled game function, for example after the elapse of a certain period of time.

More specifically, the terminal control unit 35 cooperates with the first server device 10 to control the state of a user who uses the terminal device 30 in the first service. For example, the terminal control unit 35 and the first server device 10 may change the state of a user who uses the terminal device 30 from the normal state to the specific state in response to occurrence of the above-mentioned first event related to the user. The terminal control unit 35 and the first server device 10 may dissolve the specific state of the user after the elapse of a certain period of time.

While the user is in the specific state, the terminal control unit 35 cooperates with the terminal device 10 as described above to activate a game effect in which the user can more advantageously play the game for the user.

The terminal control unit 35 may transmit the third instruction to the first server device 10 when the user enters the specific state. The third instruction includes an instruction to cause the first server device 10 to transmit, to the second server device 20, a disclosure request for information such as a message indicating that the user is in the specific state. That is, the terminal control unit 35 may transmit the information disclosure request to the second server device 20 via the first server device 10. When the terminal control unit 35 receives, from the first server device 10, a notification of completion of a series of processes responding to the third instruction, the terminal control unit 35 shows the completion of the series of processes on the display unit 33.

Alternatively, when the user enters the specific state, the terminal control unit 35 may interrupt the first application and activate the above-described second application. The second application may transmit, to the second server device 20, for example, a disclosure request for information such as a message or the like input in an input form through a user operation. That is, the terminal control unit 35 may transmit the information disclosure request to the second server device 20 via the second application. Here, the terminal control unit 35 that executes the first application may automatically input information such as a message indicating that the user is in the specific state on the input form of the second application. In such a case, the second application is activated with the information entered in the input form.

Alternatively, when the user enters the specific state, the terminal control unit 35 may transmit, to the second server device 20, the disclosure request of information such as a message indicating that the user of the terminal device 30 is in the specific state. That is, the terminal control unit 35 may transmit the information disclosure request to the second server device 20 via the first application without involvement of either the first server device 10 or the second application.

A specific example of a screen (a sixth screen) displayed on the terminal device 30 at the time of transmitting the disclosure request via the first application or the second application will be described later. When the process of transmitting the disclosure request is completed, the terminal control unit 35 displays the completion of the transmission process on the display unit 33.

More specifically, the terminal control unit 35 displays, for each enabled game function, other user(s) associated with a bonus related to the game function such that the user can select the shown other users. In other words, the terminal control unit 35 shows one or more other users whose corresponding game function is enabled in a manner selectable for the user using the terminal device 30, from among other users in the specific state included in the second follow list of the user. A specific example of a screen (a fifth screen) for displaying other users selectably will be described later.

When at least one other user is selected from among the one or more displayed other users, the terminal control unit 35 transmits the fourth instruction to the first server device 10. The fourth instruction is an instruction to associate the selected other user with the user who uses the terminal device 30 in the game related to the first service. More specifically, the fourth instruction is an instruction to add the first identification information of the selected other user to the first follow list of the user using the terminal device 30. According to this configuration, it is possible for the user of the terminal device 30 to follow, also in the first service, other user(s) that the user follows in the second service. When the terminal control unit 35 receives, from the first server device 10, a notification of completion of the series of processes responding to the fourth instruction, the terminal control unit 35 notifies the completion of the series of processes on the display unit 33.

The operation of the terminal device 30 controlled by the terminal control unit 35 is not limited to the above example. For example, the terminal control unit 35 may further execute any process other than the above-described process in conjunction with the first server device 10 or the second server device 20 or by the terminal device 30 alone.

Screen Displayed on Terminal Device

Figure 5:
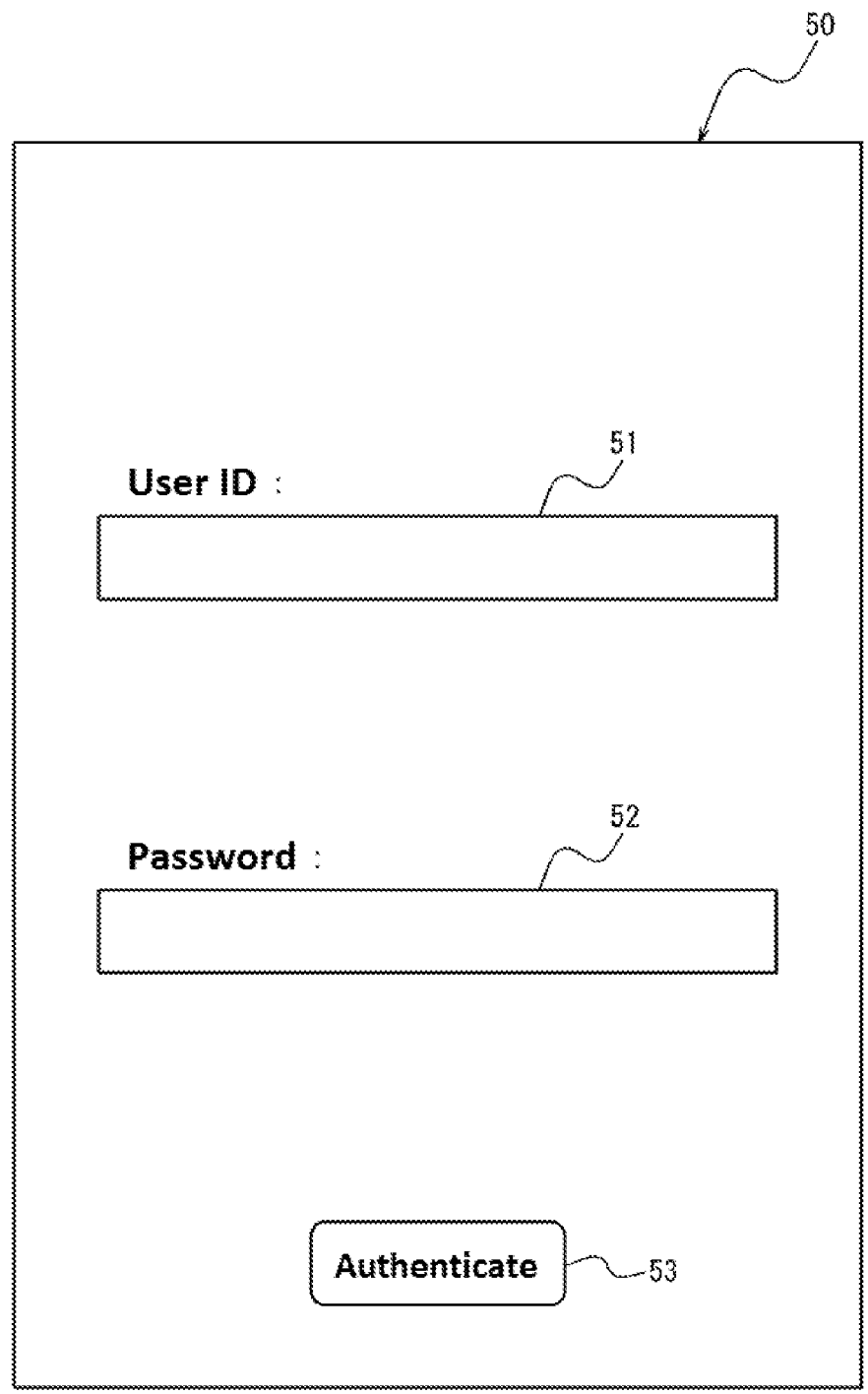
FIG. 5 shows an example of a second screen displayed by the terminal device.
Figure 6:
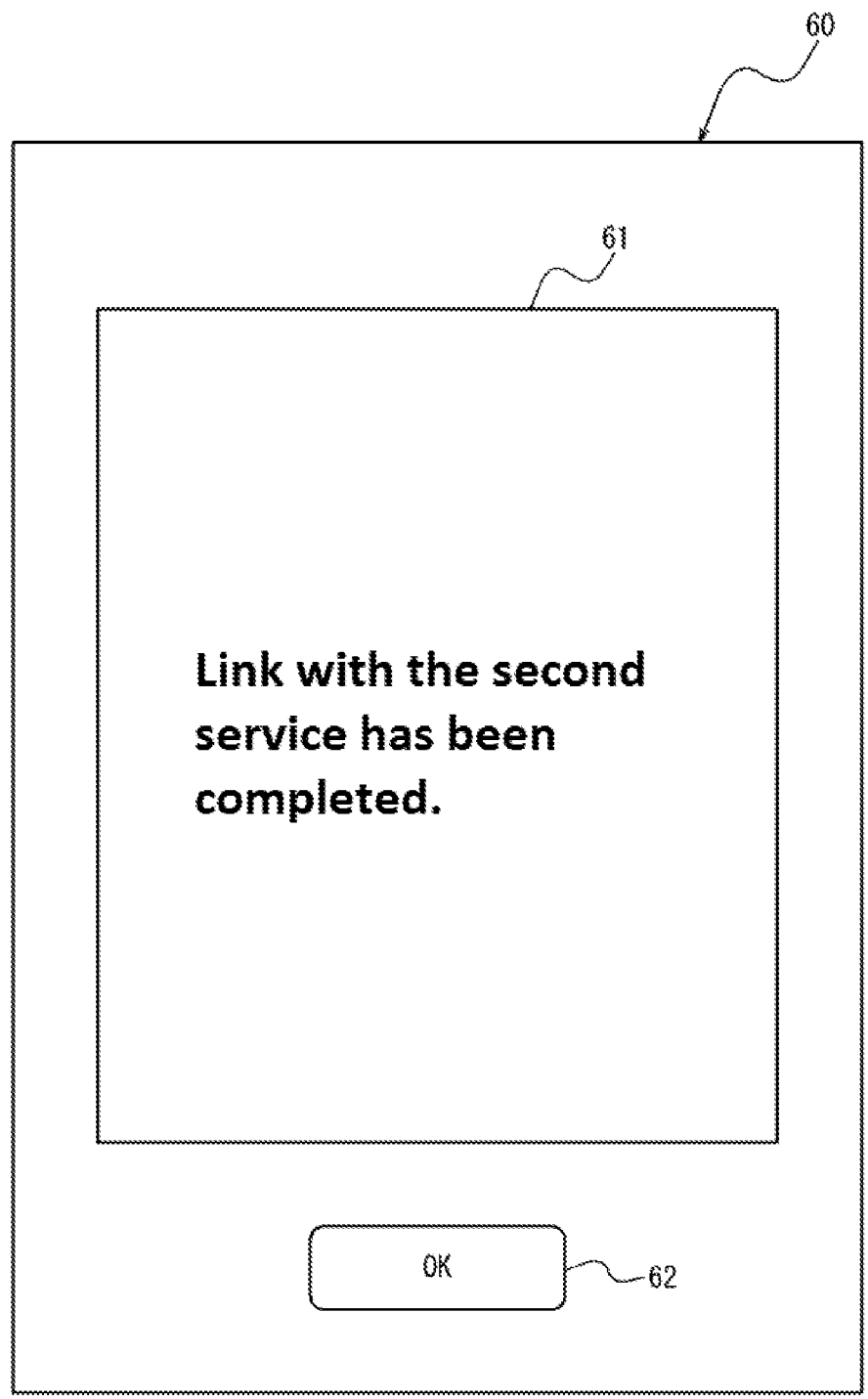
FIG. 6 shows an example of a third screen displayed by the terminal device.

Next, with reference to FIGS. 4 to 6, the first screen 40 and the second screen 50 displayed on the terminal device 30 at the time of the above-described authentication process, and the third screen 60 displayed on the terminal device at the time of execution of linking between the first service and the second service will be described.

Figure 4:
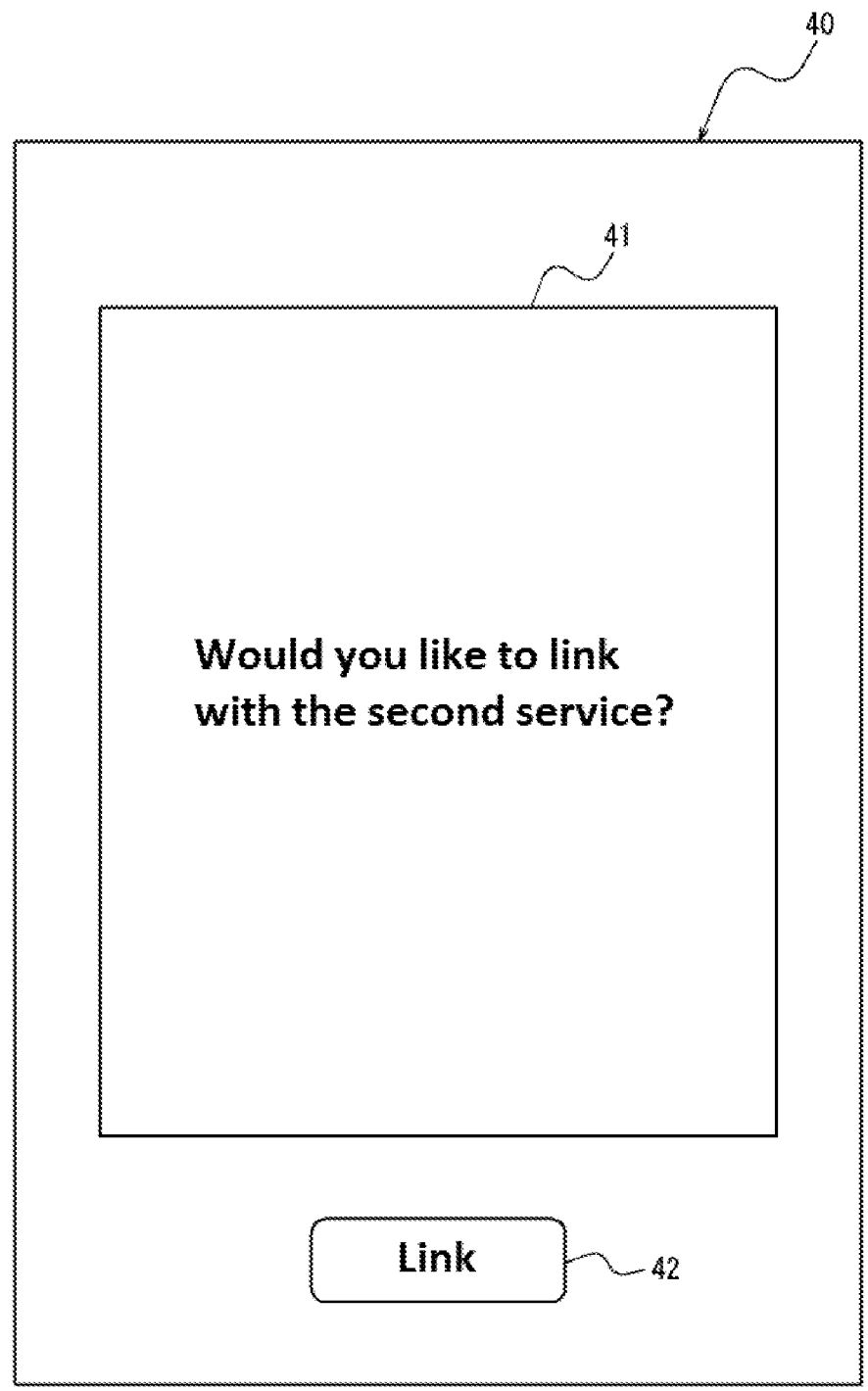
FIG. 4 shows an example of a first screen displayed by a terminal device.

Upon starting the authentication process, the terminal control unit 35 that executes the first application displays the first screen 40 shown in FIG. 4 on the display unit 33. The first screen 40 includes a message display area 41 and a link button 42.

The information display area 41 is an area to display information such as a message for confirming user's intention to perform linking between the first service and the second service. The link button 42 is a GUI for receiving a user operation. Upon detecting a user operation on the link button 42, the terminal control unit 35 works together with the second server device 20 to display the second screen 50 shown in FIG. 5 on the display unit 33. The second screen 50 may be displayed on the first application or may be displayed on a browser application activated by interrupting the first application. The second screen 50 includes a first input form 51, a second input form 52, and an authentication button 53.

The first input form 51 is an area for inputting a user ID for logging in to the second service. The second input form 52 is an area for inputting a password for logging in to the second service. The authentication button 53 is a GUI for receiving a user operation. Upon detecting a user operation on the authentication button 53, the terminal control unit 35 works with the second server device 20 to execute the above-described authentication process. For example, when it is determined that the user ID and the password input to the first input form 51 and the second input form 52 are correct, the authentication process is completed. Upon the completion of the authentication process, the terminal control unit 35 transmits the above-described first instruction to the first server device 10. When the terminal control unit 35 receives, from the first server device 10, a notification of completion of the series of processes responding to the first instruction, the terminal control unit 35 displays the third screen 60 shown in FIG. 6 on the display unit 33. The third screen 60 may be displayed on the first application or may be displayed on a browser application activated by interrupting the first application. The third screen 60 includes an information display area 61 and an OK button 62.

The information display area 61 is an area in which information such as a message indicating the completion of the series of processes according to the above-mentioned first instruction is displayed. The OK button 62 is a GUI for receiving a user operation. Upon detecting a user's operation on the OK button 62, the terminal control unit 35 redirects the screen on the display unit 33 to a game screen.

Figure 7:
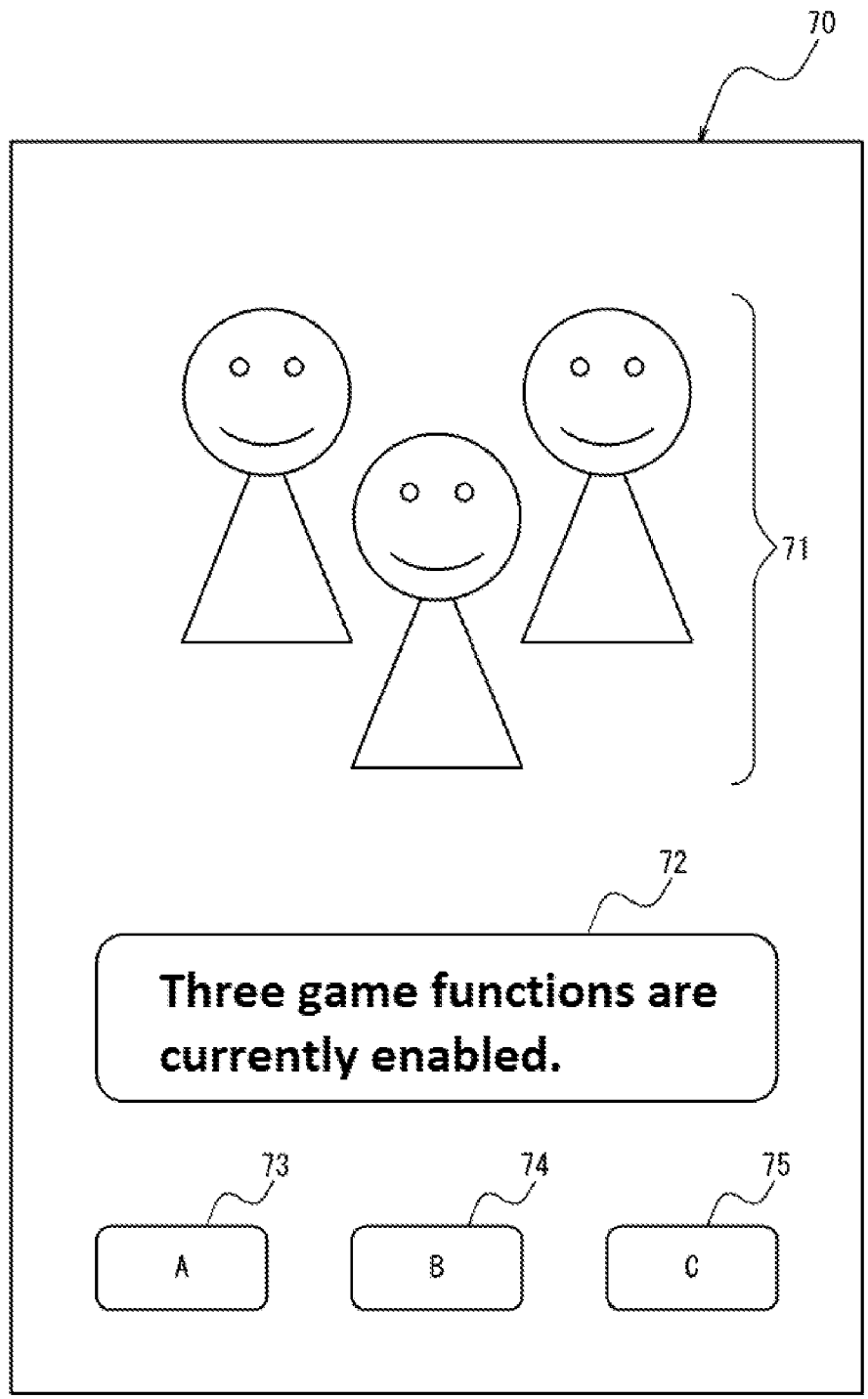
FIG. 7 shows an example of a fourth screen displayed by the terminal device.

Next, with reference to FIG. 7, the fourth screen 70 displayed on the display unit 33 of the terminal device 30 will be specifically described. The fourth screen 70 is displayed in response to occurrence of the above-described second event. The fourth screen 70 shown in FIG. 7 is an example of the above-mentioned home screen. The fourth screen 70 includes a game content image 71, a notification area 72, and three redirect buttons 73, 74, and 75. Any number of redirect buttons may be provided as needed.

The game content image 71 is, for example, an image of a game content (for example, a character) possessed by the user in a game. The notification area 72 is an area to show information such as a message for notifying the user of enabled game functions. For example, in the notification area 72 shown in FIG. 7, a message indicating that three game functions are available is displayed. The notification area 72 may function as a GUI for receiving a user operation. Upon detecting a user operation on the notification area 72, the terminal control unit 35 works with, for example, the first server device 10 to redirect the screen on the display unit 33 to the fifth screen, which will be described later.

The redirect buttons 73, 74, and 75 are provided corresponding to different game parts. Each of the redirect buttons 73, 74, and 75 is a GUI for receiving a user operation. Upon detecting a user operation on any of the redirect buttons 73, 74, or 75, the terminal control unit 35 works with, for example, the first server device 10 to redirect the screen on the display unit 33 to a screen dedicated to a game part corresponding to the button and starts the game part. For example, in response to a user operation on the redirect button redirect, a game part A for performing reinforcement, deletion and the like of a game content possessed by the user in the game may be started. In response to a user operation on the transition button 74, a game part B for selecting a quest or a mission which the user challenges in the game may be started. In response to a user operation on the transition button 75, a game part C for acquiring a game content such as an item and a virtual currency usable by the user in the game may be started. However, the content of the game part corresponding to each of the transition buttons 73, 74, and 75 is not limited to the examples described above and may be any contents.

Figure 8:
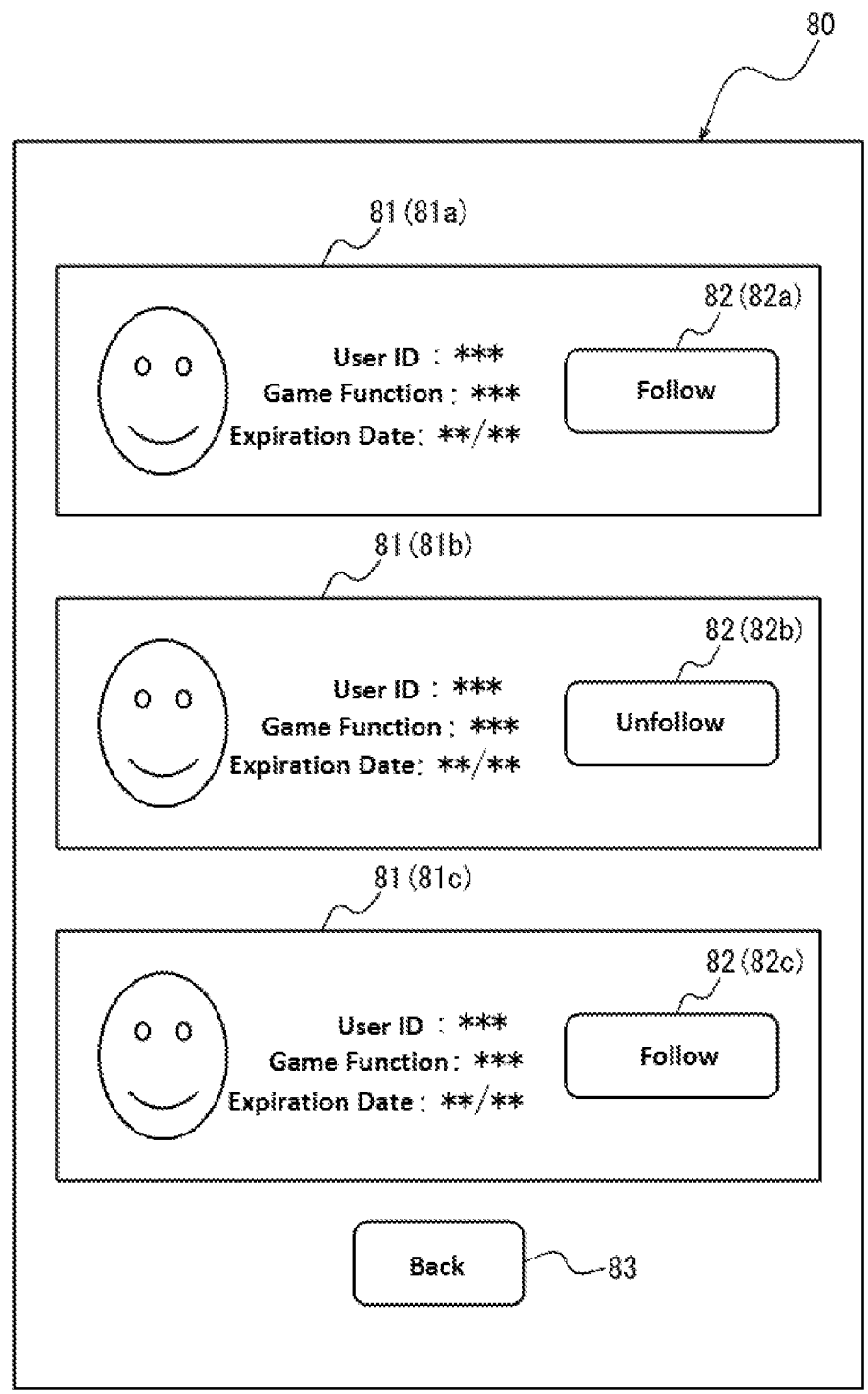
FIG. 8 shows an example of a fifth screen displayed by the terminal device.

With reference to FIG. 8, the above-described fifth screen 80 will be specifically described. The fifth screen 80 is a screen for displaying, for each enabled game function, other user(s) corresponding to the game function such that the user can select the other user(s). The fifth screen 80 includes one or more user display areas 81, one or more control buttons 82, and a back button 83.

The one or more user display areas 81 are provided so as to correspond one or more other users respectively whose corresponding game function is enabled from among other users in the specific state included in the second follow list of the user using the terminal device 30. The user display areas 81 are areas in which any information about the corresponding other users are displayed. For example, in the example shown in FIG. 8, three user display areas 81 (81*a*, 81*b*, and 81*c*) are displayed. In each user display area 81, three pieces of information: the user ID of the corresponding other user in the second service, a game function corresponding to the other user, and a expiration date indicating the timing at which the game function is disabled, are shown.

One or more control buttons 82 are provided corresponding to one or more user display areas 81 described above. The control buttons 82 are GUIs for receiving a user operation. For example, in the example shown in FIG. 8, three control buttons 82 (82*a*, 82*b*, and 82*c*) are displayed. For example, a message such as "follow" or "unfollow" may be shown on the control buttons 82.

More specifically, when the first identification information of other user corresponding to the control button 82 is not included in the first follow list of the user of the terminal device 30, the terminal control unit 35 displays the message "follow" on the control button 82. When detecting a user operation on the control button 82 on which the "follow" message is displayed, the terminal control unit 35 works with the first server device 10 to add the first identification information of the other user corresponding to the control button 82 to the first follow list of the user of the terminal device 30.

Whereas when the first identification information of the other user corresponding to the control button 82 is included in the first follow list of the user of the terminal device 30, the terminal control unit 35 displays the message "unfollow" on the control button 82. When detecting a user operation on the control button 82 on which the "unfollow" message is displayed, the terminal control unit 35 works with the first server device 10 to delete the first identification of the other user corresponding to the control button 82 from the first follow list of the user of the terminal device 30.

According to this, it is possible to visually recognize other users corresponding to an enabled game function at a glance. In addition, the user is able to simply add other user(s) included in the second follow list of the user to the first follow list of the user or delete other user(s) from the first follow list only by operating the control button(s) 82. Since the user can manage the first follow list with a simple user operation in this manner, the user operation becomes less complicated.

Figure 9:
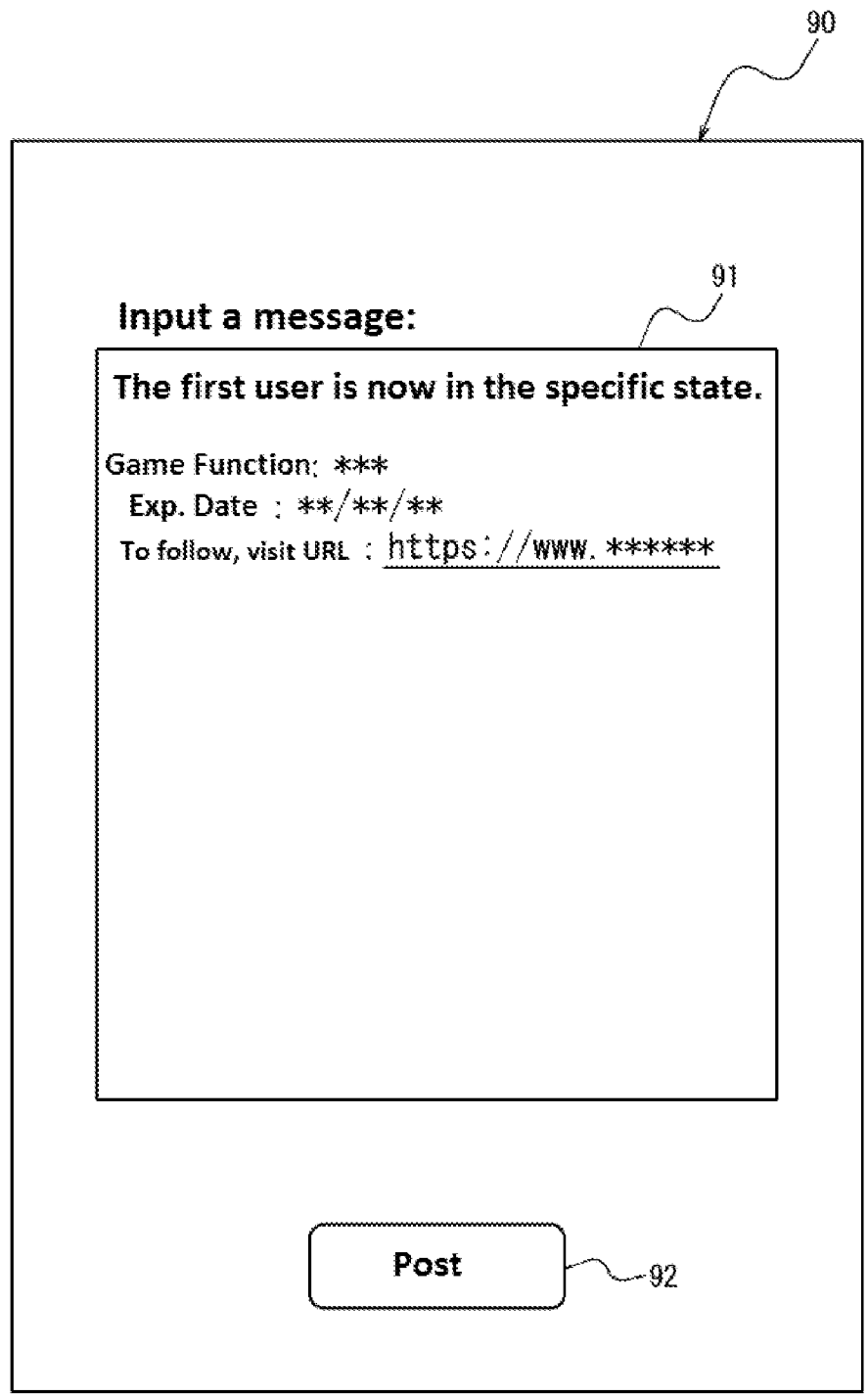
FIG. 9 shows an example of a sixth screen displayed by the terminal device.

Next, with reference to FIG. 9, the sixth screen 90 displayed on the display unit 33 of the terminal device 30 will be specifically described. The sixth screen 90 is a screen displayed on the terminal device 30 at the time of transmitting the disclosure request via the first application or the second application as described above. More specifically, the sixth screen 90 may be displayed on the second application activated by interrupting the first application when the user using the terminal device 30 enters the specific state as described above. Alternatively, the sixth screen 90 may be displayed on the first application when the user using the terminal device 30 becomes the specific state as described above. The sixth screen 90 includes an input form 91 and a post button 92.

The input form 91 is, for example, an area for inputting information such as a message. The terminal control unit 35 automatically inputs predetermined information to the input form. For example, the predetermined information may include a message indicating that the user using the terminal device 30 is in the specific state (for example, the message "the first user is in the specific state" in FIG. 9). The predetermined information includes a message about a bonus to be given to other user(s) when the other user(s) adds the second identification information of the user using the terminal device 30 to the second follow list of the other user(s) (for example, a message indicating a game function corresponding to the bonus, etc.). The predetermined information may include an expiration date or time indicating when the game function corresponding to the bonus is disabled. The predetermined information may include a URI for allowing other user(s) to add the second identification information of the user using the terminal device 30 to the second follow list (for example, URL of a web page for following the user in the second service, etc.). The predetermined information is not limited to the example described above, and may include, for example, a title of the game, a URI for downloading the first application, and the like. The terminal control unit 35 may modify the information in the input form 91 according to user's operation.

The post button 92 is a GUI for receiving a user operation. When a user operation on the post button 92 is detected, the terminal control unit 35 transmits a disclosure request of the information input to the input form 91 to the second server device 20.

First Operation of Information Processing System

Figure 10:
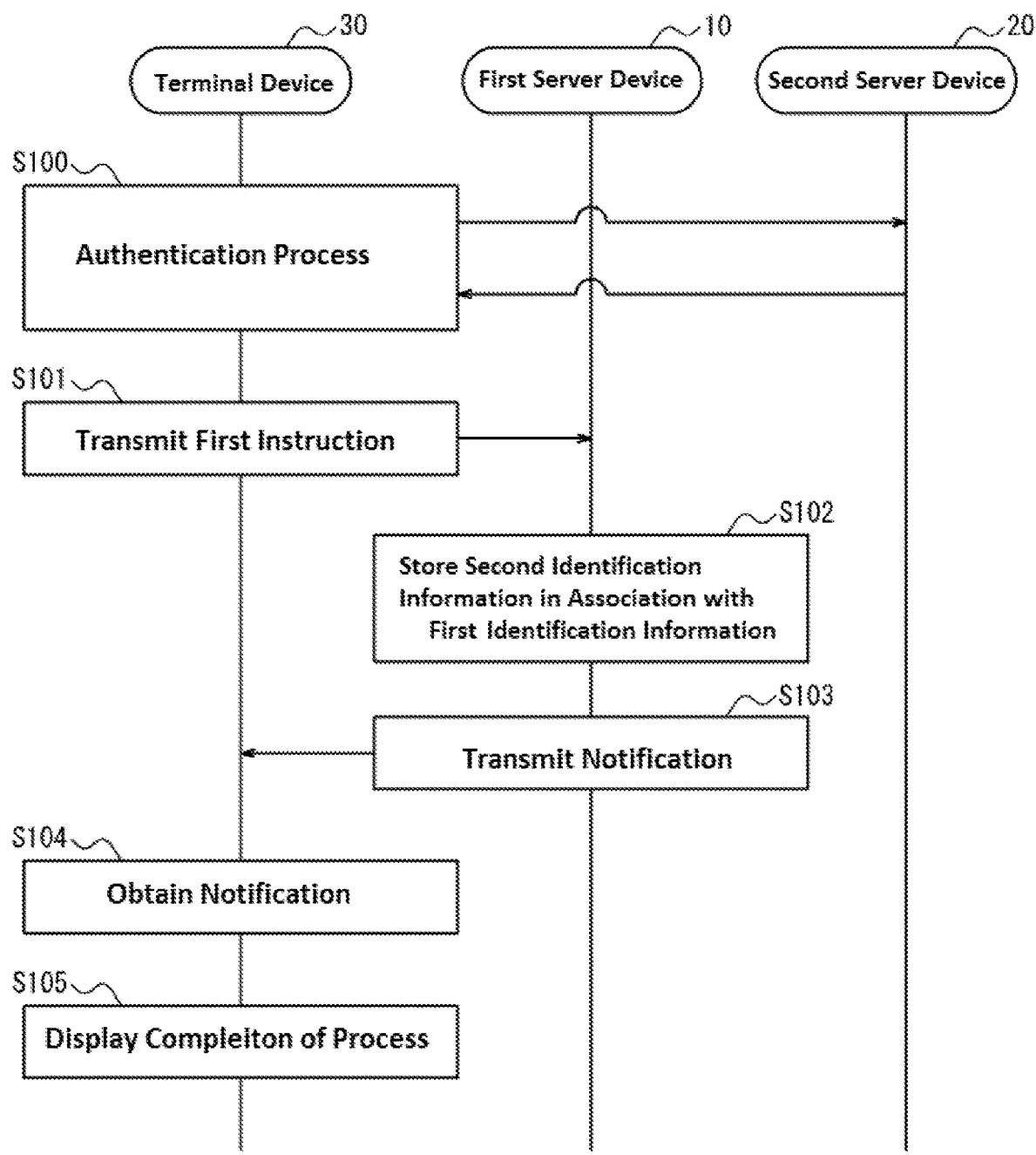
FIG. 10 is a sequence diagram showing a first operation of the information processing system.

A first operation of the information processing system 1 will be now described with reference to FIG. 10. The first operation includes an operation related to linking between the first service and the second service.

Step S100: The terminal device 30 works with the second server device 20 to execute an authentication process concerning linking between the first service and the second service. When the authentication process is executed, the terminal device 30 may display the first screen 40 and the second screen 50 described above.

Step S101: After linking between the first service and the second service is permitted through the authentication process, the terminal control unit 30 transmits the first instruction to the first server device 10. The first instruction includes an instruction to cause the first server device 10 to store the second identification information of the user using the terminal device 30 in association with the first identification information of the user.

Step S102: In response to the first instruction from the terminal device 30, the first server control unit 10 obtains the second identification information of the user who uses the terminal device 30 and stores the second identification information in association with the first identification information of the user.

Step S103: Upon completion of the series of processes in response to the first instruction, the first server device 10 transmits a notification of the completion of the series of processes to the terminal device 30.

Step S104: The terminal device 30 obtains from the first server device 10 the notification of completion of the series of processes responding to the first instruction.

Step S105: The terminal device 30 displays completion of the series of processes responding to the first instruction. Specifically, the terminal device 30 may display the above-described third screen 60.

Second Operation of Information Processing System

Figure 11:
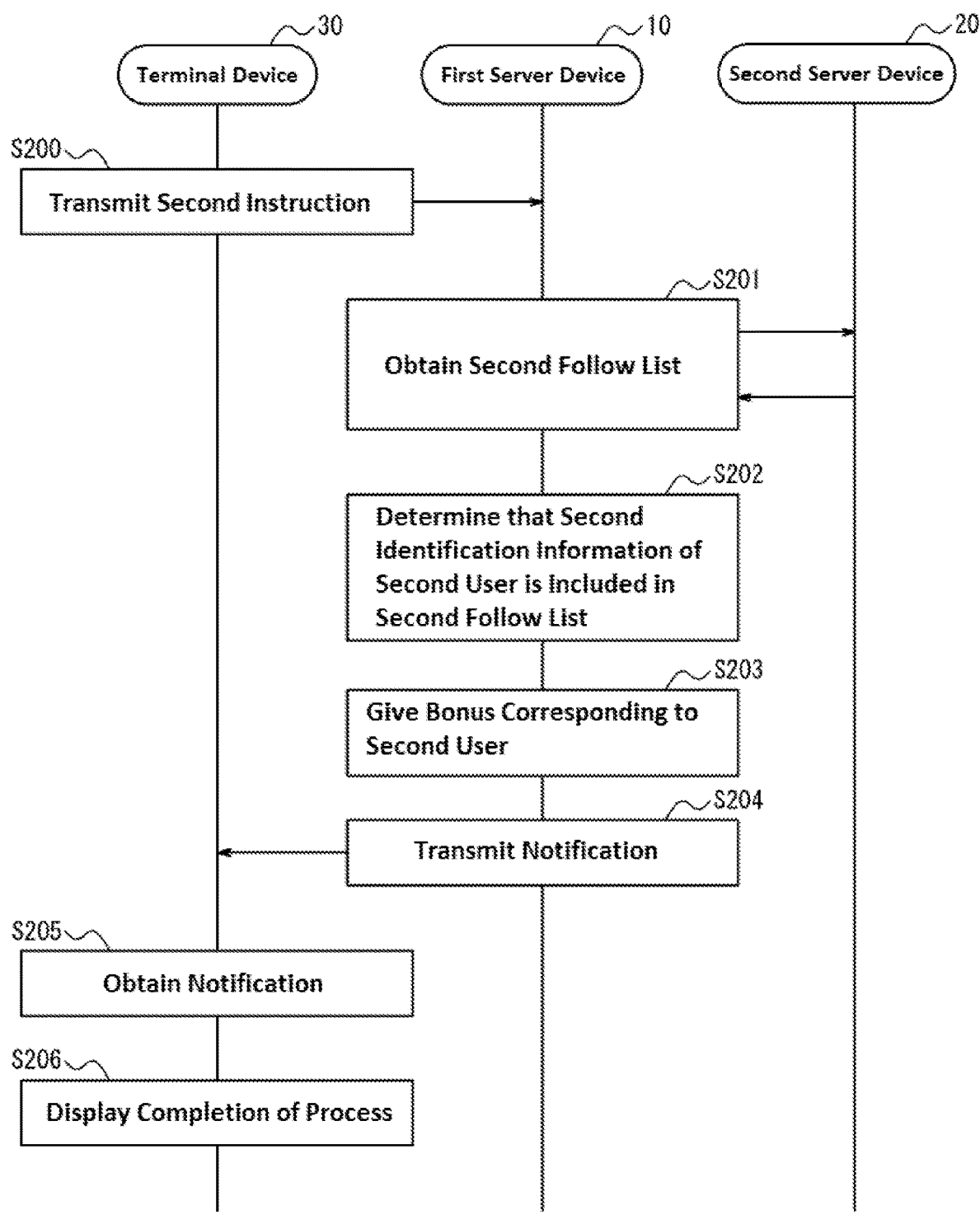
FIG. 11 is a sequence diagram showing a second operation of the information processing system.

A second operation of the information processing system 1 will be now described with reference to FIG. 11. The second operation includes operations related to giving the bonus as described above.

Step S200: The terminal device 30 transmits the second instruction to the first server device 10. The second instruction includes an instruction to cause the first server device 10 to obtain the latest second follow list of the user (the first user) using the terminal device 30 from the second server device 20 and an instruction to give the first user a bonus associated with a predetermined other user (the second user) when the second identification information of the second user is included in the obtained second follow list. As described above, the second user may include a user who is in the specific state in the first service as described above, but it is not limited thereto.

Step S201: The first server device 10 obtains the latest second follow list of the first user from the second server device 20 in response to the second instruction from the terminal device.

Step S202: The first server device 10 determines whether the second identification information of the second user is included in the second follow list obtained in step S201. Here, it is assumed that it is determined that the second identification information of the second user is included in the second follow list.

Step S203: When it is determined that the second follow list obtained in step S201 includes the second identification information of the second user, the first server device 10 gives a bonus associated with the second user to the first user.

Step S204: Upon completion of the series of processes in response to the second instruction, the first server device 10 transmits a notification of the completion of the series of processes to the terminal device 30.

Step S205: The terminal device 30 obtains from the first server device 10 the notification of completion of the series of processes responding to the second instruction.

Step S206: The terminal device 30 displays completion of the series of processes responding to the second instruction.

As described above, the terminal device 30 according to the embodiment transmits the first instruction to cause the first server device 10 to store the second identification information of the user (the first user) of the terminal device 30 in association with the first identification information. The terminal device 30 transmits the second instruction to cause the first server device 10 to obtain the second follow list of the first user from the second server device 20 and cause the first server device 10 to give the first user the bonus corresponding to the second user when the second follow list includes the second identification of the second user. According to this, the first user is able to receive the bonus from the first server device 10 that is used to provide the first service by following the second user in the second service. In this way, it is possible to give users motivation to use both the first service and the second service with the terminal device 30 of the embodiment. Consequently use of the service by users are promoted.

Although the present disclosure has been described with reference to the accompanying drawings and embodiment, it should be noted that various changes and modifications can be made as would be understood by one of ordinary skill in the art based on the disclosure. Therefore, any such changes and modifications are intended to be included within the spirit and scope of the disclosure. For example, a function and the like included in each means, each step and the like can be relocated as long as it does not logically contradict, and a plurality of means, steps or the like may be combined into a single means or step or may be divided.

For example, in the above-described embodiment, the terminal device 30 may execute a part or all of the operations and processes executed by the first server device 10 or the second server device 20. For example, the processes in steps S201, S202, and S203 in FIG. 11 may be executed by the terminal device 30. Likewise, the first server device 10 or the second server device 20 may execute a part of the operations performed by the terminal device 30. For example, any one of the first server device 10, the second server device and the terminal device 30 may execute processes concerning display control of various screens displayed on the terminal device 30 and control of various GUIs. Alternatively such processes may be executed by the server device 10 or the second server device 20 in conjunction with the terminal device 30.

In the above-described embodiment, an example of the operations of the information processing system 1 has been described with reference to FIGS. 10 and 11. However, some steps included in the operations, or some operations included in one step may be omitted. The order of a plurality of steps may be changed to the extent where the steps do not logically contradict to each other. Moreover, there may be any other step between the steps.

In the above embodiment, at least a part of the screen displayed on the terminal device 30 is displayed as a web page display on the terminal device 30 based on the data created by the first server device 10 or the second server device 20, and at least another part of the screen may be displayed as a native display that is displayed by a native application (the first application or the second application) installed in the terminal device 30. In this manner, the game in the above-described embodiment may be a hybrid game in which the first server device 10 and the terminal device 30 execute corresponding parts of the process respectively.

Moreover, to realize the first server device 10, the second server device 20, or the terminal device 30 of the above-described embodiment, an information processing apparatus such as a computer, a smart phone or the like may be preferably used. Such an information processing apparatus stores a program describing a process for realizing the function of the first server device 10, the second server device 20, or the terminal device 30 according to the embodiment respectively in a storage unit of the information processing apparatus. The function can be realized by reading the program by the CPU of the information processing apparatus and executing the program.

What is claimed is:

1. A computer-readable tangible non-transitory storage medium comprising executable instructions that, when executed, causes a terminal device to effectuate operations, the terminal device being communicable with (i) a first server device that stores first identification information uniquely identifying a plurality of first service users and (ii) a second server device that stores second identification information uniquely identifying a plurality of second service users, wherein each of the plurality of first service users is a member of a first service provided by the first server device, and wherein each of the plurality of second service users is a member of a second service provided by the second server device, the operations comprising:
   transmitting, to the first server device, a first instruction to store the second identification information of a first user, wherein:
      the first user is one of the plurality of first service users using the terminal device,
      the first user is one of the plurality of second service users, and
      the second identification information of the first user is associated with the first identification information of the first user;
   obtaining, from the first server device, a notification of completion of a process responding to the first instruction;
   causing the notification of the completion of the process responding to the first instruction to be displayed;
   transmitting, to the first server device, a second instruction to give the first user a bonus corresponding to a second user, wherein:
      the second user is one of the plurality of second service users,
      the bonus is given when the second identification information of the second user is determined to be included in list information associated with the first user,
      the list information comprises the second identification information of each of one or more of the plurality of second service users associated with the first user and is stored in the second server device, and
      the bonus corresponding to the second user is given to the first user in the first service;
   obtaining, from the first server device, a notification of completion of a process responding to the second instruction; and
   causing the notification of the completion of the process responding to the second instruction to be displayed.

2. The computer-readable tangible non-transitory storage medium of claim 1, wherein the second user is in a specific state, the specific state being dissolved when a predetermined condition is satisfied.

3. The computer-readable tangible non-transitory storage medium of claim 2, wherein the operations further comprise:
  transmitting, to the first server device, a third instruction to transmit a disclosure request for information indicating that the first user is in the specific state to the second server device.

4. The computer-readable tangible non-transitory storage medium of claim 2, wherein the operations further comprise:
  activating an application capable of transmitting, to the second server device, a disclosure request for information input in an input form; and
  automatically inputting, in the input form of the application, information indicating that the first user is in the specific state.

5. The computer-readable tangible non-transitory storage medium of claim 2, wherein the operations further comprise:
  transmitting, to the second server device, a disclosure request for information indicating that the first user is in the specific state.

6. The computer-readable tangible non-transitory storage medium of claim 2, wherein a user enters the specific state in response to occurrence of a first event related to the user.

7. The computer-readable tangible non-transitory storage medium of claim 6, wherein the first event includes an event occurring in a game played by the user.

8. The computer-readable tangible non-transitory storage medium of claim 1, wherein the second instruction is transmitted in response to an occurrence of a second event in a game executed by the terminal device.

9. The computer-readable tangible non-transitory storage medium of claim 8, wherein the second event includes an event in which a screen is redirected to a predetermined screen in the game.

10. The computer-readable tangible non-transitory storage medium of claim 1, wherein the second instruction is transmitted after a predetermined period of time has elapsed after a previous transmission of the second instruction.

11. The computer-readable tangible non-transitory storage medium of claim 1, wherein the operations further comprise:
  enabling a game function corresponding to the bonus in a game executed by the terminal device.

12. The computer-readable tangible non-transitory storage medium of claim 11, wherein the operations further comprise:
  disabling the enabled game function when a predetermined period of time has elapsed or when a number of times of execution of a game process corresponding to the game function reaches a predetermined number.

13. The computer-readable tangible non-transitory storage medium of claim 11, wherein a number of enabled game functions that can exist simultaneously is limited.

14. The computer-readable tangible non-transitory storage medium of claim 11, wherein the operations further comprise:
  selectably displaying one or more other users for each game function; and
  transmitting, to the first server device, a fourth instruction to associate the first user with the one or more other users in the game executed by the terminal device.

15. The computer-readable tangible non-transitory storage medium of claim 1, wherein the bonus is provided to the first user in the first service without requiring an input from the first user after the second user appears in the list information.

16. A terminal device comprising:
  a communication unit capable of communicating with (i) a first server device that stores first identification information uniquely identifying a plurality of first service users and (ii) a second server device that stores second identification information uniquely identifying a plurality of second service users, wherein each of the plurality of first service users is a member of a first service provided by the first server device, and wherein each of the plurality of second service users is a member of a second service provided by the second server device;
  a display unit; and
  a control unit, wherein the control unit is configured to:
    transmit, to the first server device, a first instruction to store the second identification information of a first user, wherein:
      the first user is one of the plurality of first service users using the terminal device,
      the first user is one of the plurality of second service users, and
      the second identification information of the first user is associated with the first identification information of the first user;
    obtain, from the first server device, a notification of completion of a process responding to the first instruction;
    cause the notification of the completion of the process responding to the first instruction to be displayed on the display unit;
    transmit, to the first server device, a second instruction to give the first user a bonus corresponding to a second user, wherein:
      the second user is one of the plurality of second service users,
      the bonus is given when the second identification information of the second user is determined to be included in list information associated with the first user,
      the list information comprises the second identification information of each of one or more of the plurality of second service users associated with the first user and is stored in the second server device, and
      the bonus corresponding to the second user is given to the first user in the first service;
    obtain, from the first server device, a notification of completion of a process responding to the second instruction; and
    cause the notification of the completion of the process responding to the second instruction to be displayed on the display unit.

17. An information processing system comprising:
  a first server device that stores first identification information uniquely identifying a plurality of first service users, wherein each of the plurality of first service users is a member of a first service provided by the first server device; and
  a terminal device capable of communicating with the first server device and a second server device, wherein the second server device stores second identification information uniquely identifying a plurality of second service users, wherein:
    each of the plurality of second service users is a member of a second service provided by the second server device,
    the terminal device transmits a first instruction to the first server device, in response to the first instruction from the terminal device, the first server device stores the second identification information of a first user, wherein:
  the first user is one of the plurality of first service users using the terminal device,
  the first user is one of the plurality of second service users, and
  the second identification information of the first user is associated with the first identification information of the first user,
the terminal device transmits a second instruction to the first server device, and
in response to the second instruction from the terminal device, the first server device gives the first user a bonus corresponding to a second user, wherein:
  the second user is one of the plurality of second service users,
  the bonus is given when the second identification information of the second user is determined to be included in list information associated with the first user,
  the list information comprises the second identification information of each of one or more of the plurality of second service users associated with the first user and is stored in the second server device, and
  the bonus corresponding to the second user is given to the first user in the first service.

* * * * *